United States Patent [19]
Richman

[11] 4,321,601
[45] Mar. 23, 1982

[54] THREE DIMENSIONAL, AZIMUTH-CORRECTING MAPPING RADAR

[75] Inventor: Donald Richman, Dix Hills, N.Y.

[73] Assignee: United Technologies Corporation, Hartford, Conn.

[21] Appl. No.: 136,677

[22] Filed: Apr. 23, 1971

[51] Int. Cl.³ .............................................. G01S 13/90
[52] U.S. Cl. ................................................ 343/5 CM
[58] Field of Search ................................... 343/5 CM

[56] References Cited
U.S. PATENT DOCUMENTS

| | | | |
|---|---|---|---|
| 3,184,736 | 5/1965 | Badewitz | 343/5 CM |
| 3,228,028 | 1/1966 | Baum et al. | 343/5 CM |
| 3,365,719 | 1/1968 | Williams | 343/5 CM |
| 3,555,545 | 1/1971 | Reynolds et al. | 343/5 CM |

OTHER PUBLICATIONS

"Performance of a Synthetic-Aperature Mapping Radar System", by Jean A. Develet, Jr., IEEE Transactions ANE, Sep. 1964, pp. 173-179.

*Primary Examiner*—Malcolm F. Hubler
*Attorney, Agent, or Firm*—Melvin P. Williams

[57] ABSTRACT

A terrain mapping radar utilizes two sets of separately processed radar signals, each provided by a coherent pulse doppler synthetic aperture signal processing channel connected to and for processing the signals received from a selected one of a pair of vertically displaced antennas of the type utilized in phase interferometer radars. The invention provides depression angle, and therefore elevation information from the processed signals on a cell by cell basis, uniquely, for each range/doppler cell of each of the processing channels. The invention eliminates azimuthal errors which result from the ambiguity of the range/doppler annulus, and provides a useful map metric: elevation.

4 Claims, 17 Drawing Figures

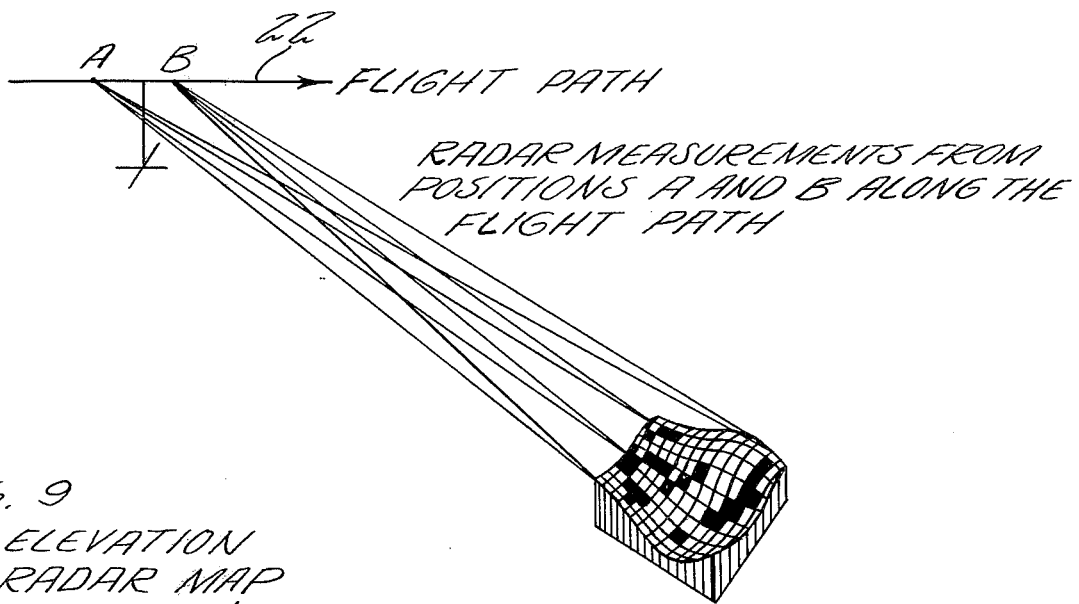
FIG. 8
RADAR MEASUREMENTS FROM POSITIONS A AND B ALONG THE FLIGHT PATH
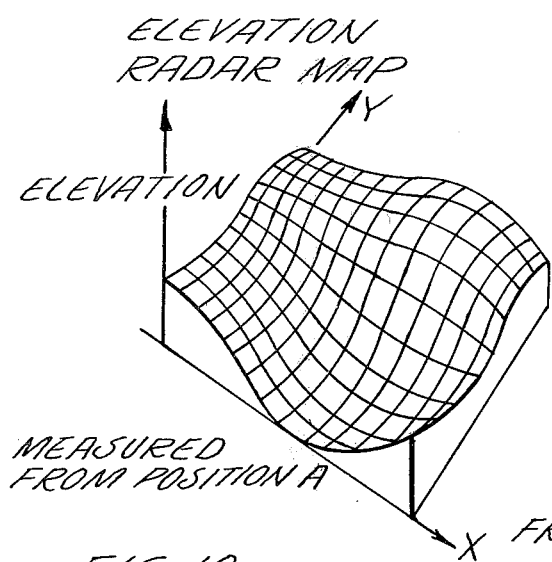
FIG. 9 ELEVATION RADAR MAP
MEASURED FROM POSITION A
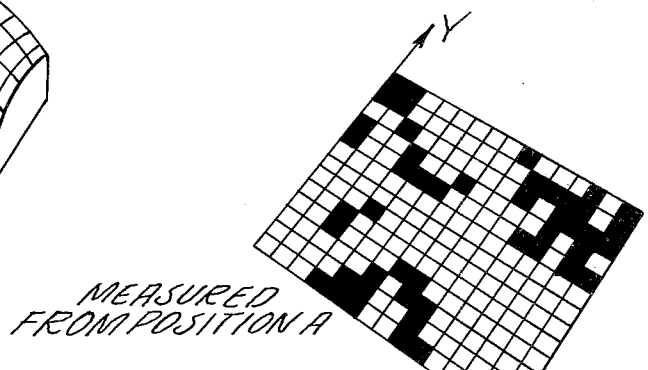
FIG. 11 (PRIOR ART) REFLECTIVITY RADAR MAP
MEASURED FROM POSITION A
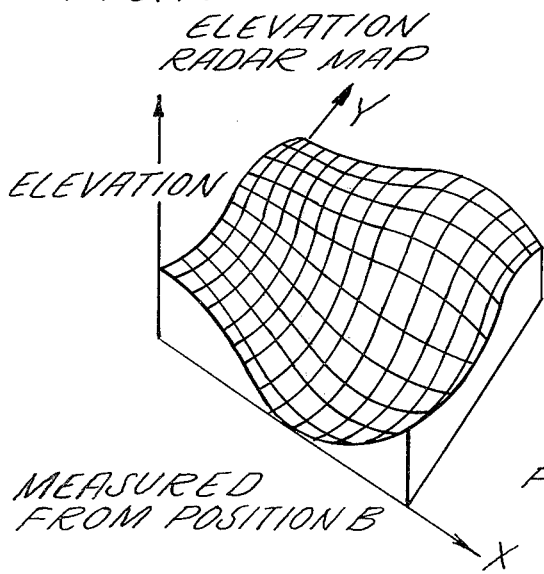
FIG. 10 ELEVATION RADAR MAP
MEASURED FROM POSITION B
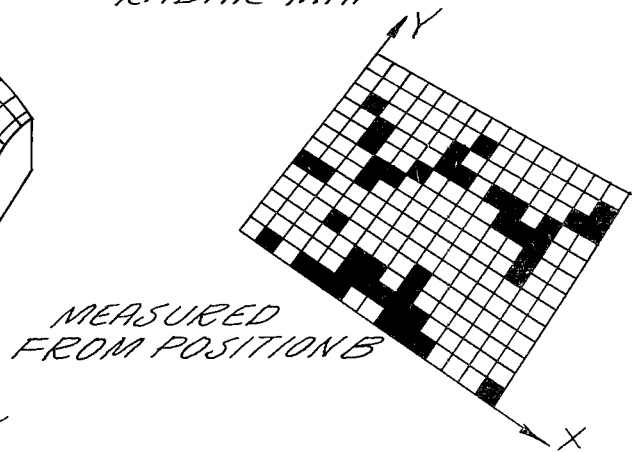
FIG. 12 (PRIOR ART) REFLECTIVITY RADAR MAP
MEASURED FROM POSITION B L = COHERENT SAMPLING INTERVAL
RADAR MAP AREA
SELECTED SLICE OF MAP COMPARATIVE OBSERVATION

REFLECTIVITY MAP

TERRAIN CONTOUR MAP

THREE DIMENSIONAL, AZIMUTH-CORRECTING MAPPING RADAR

BACKGROUND OF THE INVENTION

1. Field of Invention

This invention relates to improved terrain mapping radar processing systems, and more particularly to a forward squint, coherent pulse doppler synthetic aperture mapping radar having full three dimensional, distortionless mapping capability.

2. Description of the Prior Art

Coherent pulse doppler synthetic aperture radars of the ground mapping type are well known in the art. As is known, the principle object of one form of such a radar is to derive high resolution maps over a large area of terrain by means of processing of the coherent return received from a reflecting target area illuminated with electromagnetic waves, such as by a radar transmitting antenna, where the illuminated area is much greater than the desired map resolution. In such processing radars, the returns received by the radar antenna are first separated in accordance with range, thereby providing a plurality of range strips which are at distinct radial distances from the illuminator, or radar. Such systems also separate signals in accordance with the doppler frequency of returns received, which frequency is the difference between the frequency of the transmitted wave and the frequency of the received wave resulting from compression or expansion of the reflected wave due to a closing or opening velocity of the antenna with respect to a given reflector. Naturally, a map is defined when each resolvable point of intensity is expressible by the analysis of signals which have in the information content thereof, designations of range and a second coordinate such as relative angle with respect to the flight path of the radar antenna. Thus, the synthetic aperture radar provides, through signal processing, extremely high resolution, equivalent to that achievable with an antenna of a much larger size.

Mapping radars of this type produce, basically, reflectivity maps. That is, the map is substantially a matrix of the intensity of reflections received from the area. However, reflectivity of most objects varies in dependence upon the angle at which they are illuminated. Additionally, since one use for a radar map is to compare it with later radar maps of the same area, thereby to determine position and other parameters through map matching, it is desirable that radar maps be reproducible to some comparable correspondence and quality. However, the reflectivity of objects in most cases varies as a function of time and weather, as well as being highly dependent upon the direction of incidence and direction of reflection.

As the radar-carrying aircraft flies along its path over the sampling distance (that distance between the time when a given target is first picked up and monitored and the last time at which the target is monitored), the target response scintillates, in dependence on its electromagnetic and geometric properties, and on the particular angle at which it is illuminated by the radar. Therefore, not only does the phase of the target response change over the sampling interval, but there can be significant differences in the amplitude of response over the sampling interval. When non-coherent map averaging is employed, the phasors (of which each response is comprised) may in fact average to zero over a long enough sampling interval; in such cases, therefore, only the average of the magnitude is utilized, and the phase information is discarded. This non-coherent integration comprises a form of non-coherent integration which has been used in prior art systems in an attempt to suppress scintillation. Because the magnitude of radar reflectivity is integrated on a cell-by-cell basis over the region being mapped during a mapping flight, there is a loss of map resolution and a loss of effective average power as a consequence of terrain scintillation. This mitigates against the conservation of bandwidth; and, conservation of bandwidth is, of course, desirable in a high quality system handling such a large amount of information.

Another desired quality of maps made by radar would be that they bear a resemblance to aerial photographs of the same area, or to base, or topological maps. However, except for highly distinguishing features (such as a harbor), radar maps obtainable heretofore of miscellaneous terrain bear inadequate quantitative resemblance to aerial photographs or topological maps. It therefore becomes difficult to interpret characteristics of the area from the map, or to recognize and accurately locate land marks of familiar terrain on a radar map.

The coherent pulse doppler synthetic aperture processing radar, as shown to the art, utilizes range gating and doppler filtering to allocate each return signal received at the radar to a range/doppler cell. In the case of a forward or backward squint synthetic aperture radar (in contrast with a strictly side-looking radar), the processing includes compensation in range and doppler for changes therein which result from the relative velocity of the antenna system with respect to a given reflector. Thus, as an aircraft closes on a target (although not necessarily flying directly toward the target), not only will the range decrease, but the doppler frequency, in most cases, will decrease, eventually becoming zero as the aircraft flies by the target broadside, at minimum range. Therefore, even though successive return signals from a given reflector or target have different range and doppler values, they can be allocated through processor compensation to the same target, and the complex phasors of the received signals resulting from that target can be integrated over a large number of signals. The actual resulting output for a given reflector is an electrical phasor allocated to a particular point on a two dimensional matrix representing actual positions on the terrain being mapped (or otherwise illuminated by the radar). Stated alternatively, a synthetic aperture mapping radar relates an arbitrary two dimensional coordinate matrix on the ground to the position and velocity of the antenna-carrying aircraft, and then allocates phasors to each of the cells in the two dimensional matrix. The phasors may be expressed in terms of a magnitude at a phase angle, or in terms of an in-phase component and a quadrature component.

In considering such processing radars, it is well to bear in mind the distinction between the frequency shift or doppler frequency which results from the relative velocity of the antenna with respect to the reflector, and the actual phase of the signal received, resulting from total time of travel of the electromagnetic energy to and from the terrain point, and the phase shift occurring upon reflection.

In the type of radar described, points at an equal distance, or slant range, from the reflector form a sphere having its center at the antenna; the sphere has a thickness in range due to the minimum resolvable unit of range. Points of equal doppler frequency fall on a cone having the velocity vector of the aircraft as its axis; the cone has a finite cross-range thickness due to the minimum resolvable unit of doppler frequency. The intersection of the range sphere with the doppler cone for any given pair of range and doppler comprises a range/doppler annulus.

One of the major problems of synthetic aperture mapping radars of the type known to the art is that, because of the absence of contrary data, any point on a range/doppler annulus is taken to be a point on an assumed plane of flat terrain. However, as is discussed more thoroughly and illustrated hereinafter, the actual position of the reflector cannot be resolved within the annulus. In a prior art processing radar, a reflector which is at a relatively low elevation, near the bottom of the annulus, and relatively closer to the ground track of the aircraft is inseparable in location from one which is at a higher elevation and relatively farther away from the ground track of the aircraft; both points being on the same range/doppler annulus. This causes two distinct problems: the first problem is that this results in significant errors in the computed position of a reflector; this is further compounded by the fact that it renders still more pronounced, the difference in configuration of reflectivity maps which are made from varying angles of approach to a mapped area. The amount of error which results from the range/doppler ambiguity increases with increasing grazing angle: that is, the errors are greater when the altitude of the aircraft is high with respect to the distance of the target area from the ground track of the aircraft, and the errors are lesser when the target area is at a great distance from the ground track of the aircraft with respect to the altitude of the aircraft. In an X, Y, Z coordinate system in which the X axis is the ground track of the vehicle, the Z axis is elevation, and the Y axis is in the ground plane perpendicular to the ground track of the vehicle, the X, Y plane at Z=ZERO is taken to be that plane which is parallel to the earth's surface and below the aircraft by a distance which is equal to the given altitude (H) of the aircraft, as determined by on-board navigational equipment. In other words, the mapped terrain is presumed to be a plane which is H feet below the aircraft, H being the nominal, navigational altitude of the aircraft. Deviations of given points in the area being mapped from this nominal plane (actual target elevation) result in cross track errors, as proven in equations (17) through (19) hereinafter, as follows:

$$\Delta Y = -H/Y \Delta Z \qquad (1)$$

As examples, consider an aircraft flying at 12,000 feet. For a target area which is 4000 feet off the ground track of the radar, a target height of 200 feet will make a 600 foot cross track error in the map; a target which is two nautical miles off the ground track of the radar-carrying vehicle (which distance is equal to the 12,000 ft. altitude of the aircraft), having an elevation of 200 feet would cause a cross track map error of 200 feet; for a map section which is three nautical miles off the ground track of the radar, the target at an elevation of 200 feet would be located with a cross track error on the map of about 133 feet.

It should also be obvious that a great difference in this error, and in the reflectivity map (which results from known pulse doppler synthetic aperture mapping radars), will occur in dependence upon the angle from which mapping of a region is accomplished. Thus, if an aircraft flew due south, while east of a region and mapped it, positive elevations would cause targets to appear on the map more easterly than they should be. Conversely, if the plane flew due north while westerly of the same region, the elevation would now cause the target to appear, erroneously, more westerly on the map than it should. Thus not only are reflections different from different viewing angles, but map errors resulting from the ambiguity of the range/doppler annulus cause significant differences in the location on the map of a given reflective area having an elevation above the nominal ground plane.

It should further be obvious that even though the average terrain being mapped may be at a given elevation with respect to an arbitrary reference plane, adjacent land marks of vastly differing elevation will appear highly separated on the map (when in fact they are adjacent) as a result of the range/doppler ambiguity just described. Further, a tall, narrow land mark will appear, instead, as a short, wide land mark as a result of the differential error of differential elements of elevation of the tall land mark, in a fashion described with respect to equation (1) hereinbefore.

Radar mapping is likely, in general, to be performed in a noise and clutter environment. As is known, summing of the radar metric over several maps should cause the undesirable components (noise and clutter) to average out, thereby increasing the effective signal power. However, reflectivity maps of the type known to the art are substantially incapable of corresponding multiple production; that is, no two maps of the same terrain are sufficiently alike to permit addition without desired map metric signals actually cancelling each other. Therefore, information is actually lost, rather than enhanced, by averaging of prior art maps.

Coherent pulse doppler radars are also used for moving target separation, identification and tracking in which the nature of the radar (the varying doppler frequency of returns received at the antenna) is used to distinguish between different relative velocities of targets with respect to the radar-carrying vehicle: the resolution of adjacent points of terrain is not involved. In such cases, the tracking of the target supplies location information to that target, and a relative elevation of the selected target may be determined by using the techniques of an interferometer radar or of a monopulse radar. The known interferometer radar utilizes relative electrical phase difference of return waves received at two antennas vertically separated from one another to determine a depression angle with respect to a plane perpendicular to the line joining the centers of the two antennas. The known monopulse radar utilizes either phase or amplitude resolution between a pair of radar beams. However, prior tracking radars are unable to resolve the range/doppler annulus ambiguity, and are incapable of generating a terrain map. The tracking radar is useful only when a selected, dominant target is uniquely identified, and uncorrected, general depression (or elevation) is provided only with respect to a single doppler cone.

Thus, there are available a wide number of radar processing techniques for the resolution of targets and the identification of positional information with respect to those targets. However, there is not heretofore available a system for providing high resolution radar maps which accurately describe the terrain, topology and landmarks of the area being mapped, nor which are reproducible to a useful degree of correspondence without regard to the relative velocity vector direction of the mapping vehicle when making successive maps, or electromagnetic response characteristics of the map area which may vary with time and aspect. Additionally, systems capable of producing high resolution synthetic aperture three dimensional maps of the three dimensional world have heretofore been unavailable.

SUMMARY OF INVENTION

The primary object of the present invention is to provide significant improvement in coherent pulse doppler synthetic aperture processing radars.

Other objects of the invention include provision of a coherent pulse doppler synthetic aperture processing radar:

capable of producing a map which is independent of aspect of view and time-variable electromagnetic target properties;

capable of providing a radar map which is substantially free of variations resulting from the ground track or position of the particular mapping vehicle;

which provide three dimensional representations of terrain, such as maps, which bear a close correspondence with the three dimensional world represented thereby;

capable of developing, at high resolution, specific target shape signatures;

in which the range/doppler annulus ambiguity is essentially resolved;

having a non-zero average response quantity;

in which clutter and noise can be averaged out about a unique, non-zero average value response characteristic;

having a target point metric parameter which is non-scintillating over the sampling period for that target area;

of high quality, that conserves bandwidth; and capable of producing a three dimensional radar map utilizing state of the art technology and processing techniques.

In accordance with the present invention, a radar system utilizes two complete sets of coherent pulse doppler synthetic aperture map signals, processed in one or more channels independently, each signal set in response to antenna means having depression angle determining characteristics so as to provide a unique indication of depression angle to each of the individual range/doppler cells of the map matrix, whereby range/doppler annulus ambiguities are resolved. In further accord with the invention, an additional map metric, elevation, is provided relative to each resolvable map point.

In accordance with a preferred embodiment of the present invention, each of two coherent pulse doppler synthetic aperture signal processing channels is connected to a respective one of a pair of antenna means related in a fashion to provide a phase interferometer, thereby to include depression angle information in the signals being processed by the pair of channels. However, other angle-determining systems, such as phased arrays and/or monopulse systems may be employed in place of the phase interferometer system of the preferred embodiment; and multiplexing of signal sets through single channels may be employed.

The present invention achieves all of the foregoing objects and thereby constitutes a significant improvement in signal processing mapping radar systems. Other objects, features and advantages of the present invention will become more apparent in the light of the following detailed description of a preferred embodiment thereof, as illustrated in the accompanying drawing.

BRIEF DESCRIPTION OF THE DRAWING

FIG. 8 is a simplified illustration of a real-world three dimensional radar mapping situation;

FIGS. 9 and 10 are simplified illustrations of results of the mapping situation of FIG. 8 obtained in accordance with the present invention;

FIGS. 11 and 12 are simplified illustrations of the results of the mapping situation of FIG. 8 in accordance with the teachings of the prior art;

DESCRIPTION OF THE PREFERRED EMBODIMENT

Figure 1:
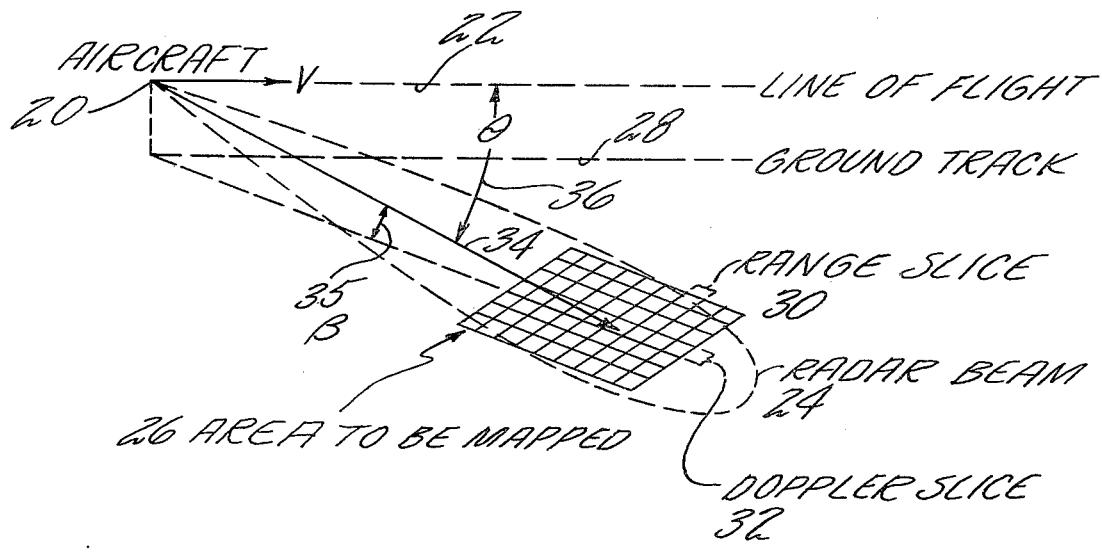
FIG. 1 is a simplified perspective illustration of a range/doppler matrix known to the art.

Referring now to FIG. 1, a simplified illustration of a known radar mapping situation is shown. Therein, an aircraft located at a point 20 is assumed to be on a straight line of flight 22 along its velocity vector, V. In the examples herein pertinent, it is assumed that the reader is oriented with respect to the aircraft so as to direct the transmitted radar beam, and to receive reflections only from the starboard (or right hand) side of the aircraft. At a given point in time, the radar beam 24 will illuminate a given patch of ground terrain inclusive of an area 26 which is to be mapped. This area, in the example herein, falls to the right of the ground track 28 of the aircraft.

Resolution of the target area into individual cells (or unit areas) much smaller than the total illuminated area is achieved by the joint results of range gating, which identifies a particular range slice 30, together with doppler filtering, which identifies a particular doppler slice 32, as is known in the art. The range slice 30 is actually the intersection of the area being mapped with an equal-range sphere (of finite thickness, and having the aircraft or radar antenna as its center). The doppler slice 32 is actually the intersection of the area being mapped with an equal doppler frequency cone (of finite thickness, and having the line of flight of the aircraft as its axis). The intersection of the range slice 30 with the doppler slice 32 defines a range/doppler cell which is the resolvable unit of area of the map. It should be understood that systems which provide mapping in accordance with the illustration of FIG. 1 are well known in the art.

Figure 2:
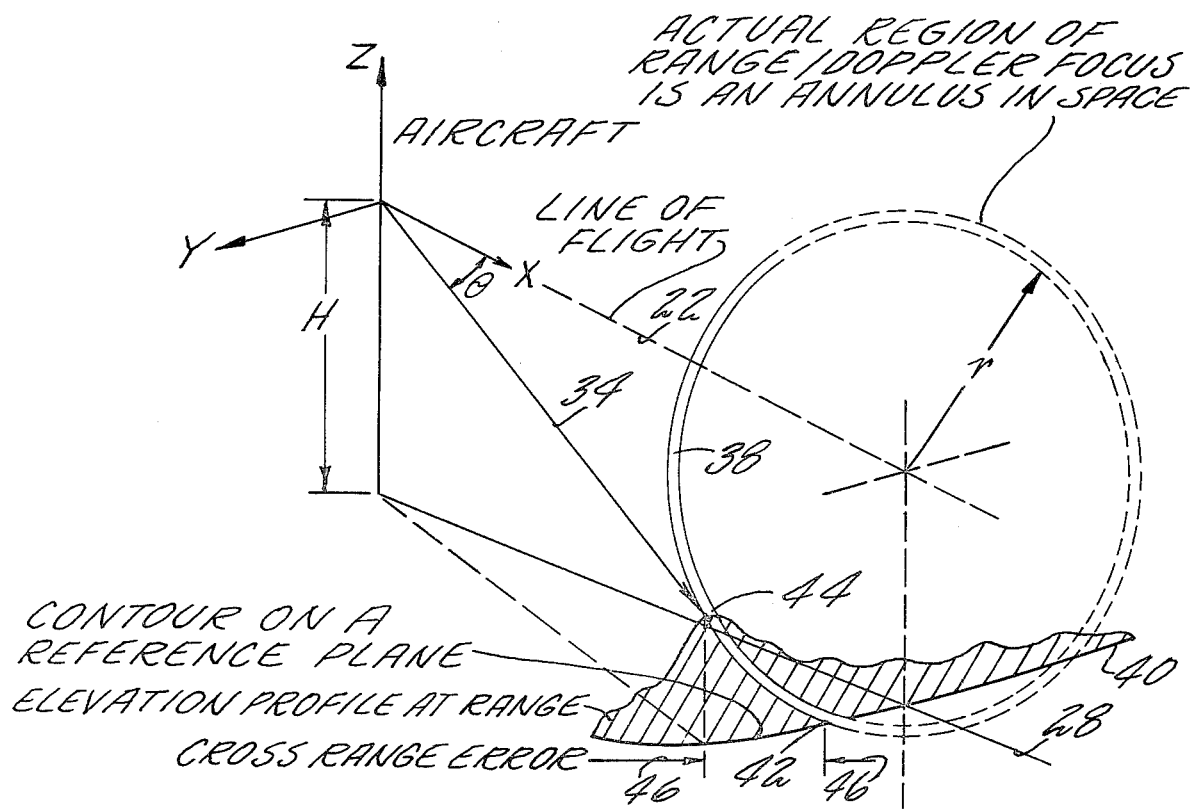
FIG. 2 is a simplified perspective illustration of the range/doppler annulus of squint mode synthetic aperture radar systems.

The actual slant range, R, to a particular range/doppler cell is illustrated by the vector 34. The angle between the line of flight 22 and the slant range vector 34 is the cone angle, $\theta$, illustrated by arrows 36. The angle of depression, $\beta$, to the target is illustrated by the arrows 35. This illustration is referenced to Cartesian coordinates with the X axis along the ground track 28, the Y axis in a horizontal plane with, and perpendicular to the X axis, and the Z axis vertical; the origin is at the aircraft, point 20, as illustrated in FIG. 2. Therein, intersection of a range sphere at slant range R with a doppler cone having a cone angle $\theta$ is an annulus 38 having its center along the line of flight and a radius, r, equal to R sin $\theta$. Assuming the aircraft to be flying at an altitude H, a coherent pulse doppler mapping radar in accordance with the prior art presumes that all targets are on a reference ground plane 40 which is displaced vertically downward from the aircraft by the distance H. That being the case, the assumption naturally is that the target return signal related to a given range R and a given doppler frequency (on the doppler cone of angle $\theta$) is at an intersection 42 of the annulus 38 with the ground plane 40. In fact, and as illustrated in FIG. 2, the target may be at a point substantially elevated from the reference plane 40, such as the point 44. In prior art coherent pulse doppler synthetic aperture radar mapping systems, the difference in elevation is not recorded over the map matrix; only reflectivity (signal amplitude) is recorded for each range/doppler cell. However, the map coordinates to which the particular range/doppler cell relate are erroneously related to the ground plane 40, but in the illustration of FIG. 2, the point 42 is beneath ground, and the actual target reflection received from the point 44 is some distance off the ground track from the point 42, as indicated by the arrows 46. This illustrates a major problem with prior art reflectivity maps: they have no provision for resolving the range/doppler annulus ambiguity over the entire map, on a cell-by-cell basis, to generate a true configuration of the mapped terrain.

This factor becomes further compounded when it is considered that should the line of flight be 180° reversed from that shown in FIG. 2, and the aircraft fly on a line of flight displaced to the left of the point 44 in FIG. 2 (that is flying in the opposite direction but still having the point 44 on the starboard or right side of the aircraft), the point 44 would then appear to be some distance to the left (as seen in FIG. 2) from its actual position. In other words, the ambiguity differs for any given reflectivity target in dependence upon the direction of flight and the relative position of the mapping vehicle to the reflectivity target. In general, the ambiguity causes relative locations of map points of differing elevation to vary with the aspect, or flight location relative to the terrain being mapped.

Figure 3:
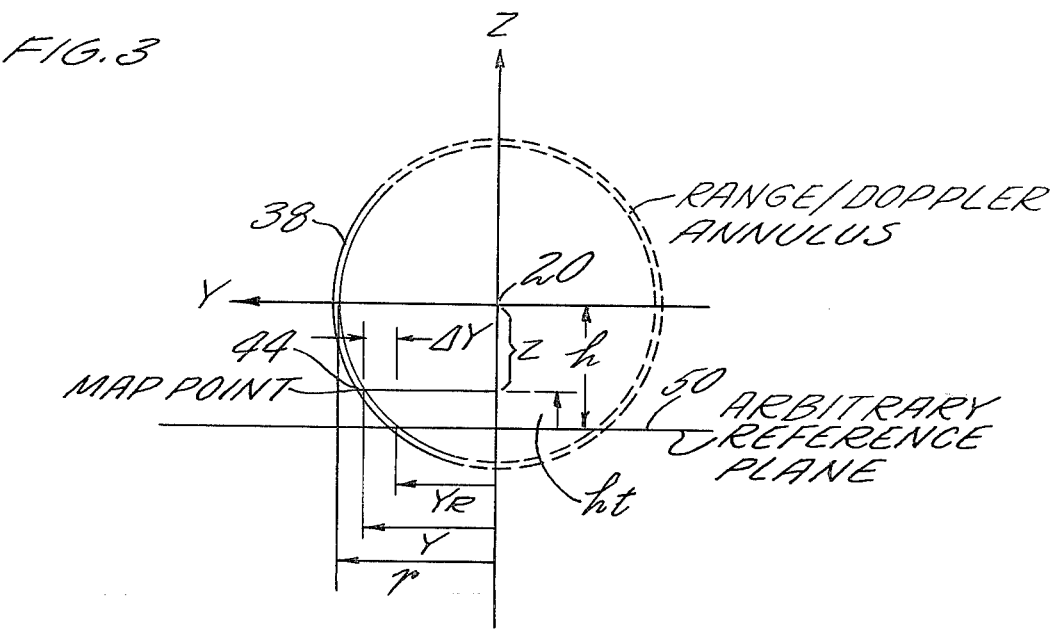
FIG. 3 is a simplified, front illustration of the range/doppler annulus of FIG. 2.
Figure 4:
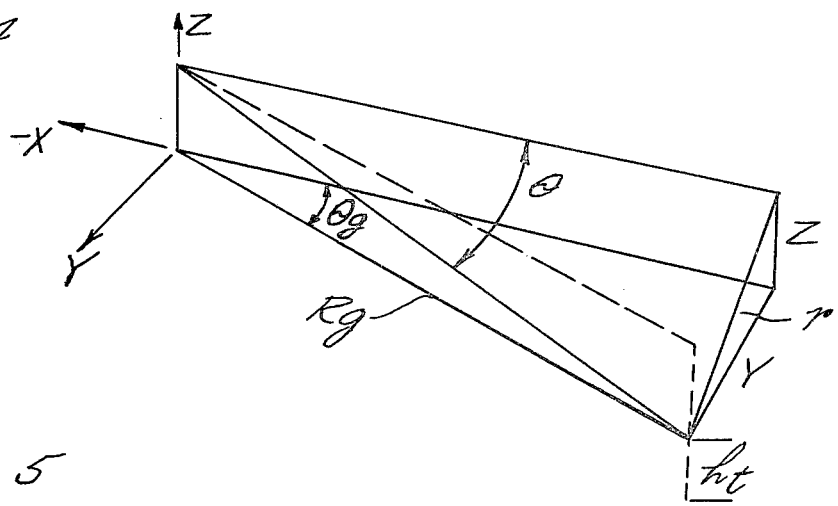
FIG. 4 is a perspective illustration of mapping geometry.

As presented hereinbefore, this error can actually be determined, and thereby shown to be considerable. Consider the diagram of FIG. 3. Therein, the arbitrary reference plane 50 has been established some distance, h, from the horizontal plane of the vector velocity. The actual point being mapped 44 is shown to be a distance $\Delta Y$ from the Y coordinate, $Y_R$, of the intersection of the range/doppler annulus 38 with the reference plane 50. The actual target point 44 being at a distance Z below the line of flight, it is also a distance $h_t$ above the arbitrary reference plane 50. Certain of the angles and coordinates are further illustrated in FIG. 4. It can be shown that a sizeable azimuthal error (an error in $\theta_g$, FIG. 4) results from the ambiguity of the range/doppler annulus as illustrated in FIGS. 2 and 3:

$$\cos \theta = \cos \beta \cos \theta_g \qquad (2)$$

$$d \cos \theta = \cos \beta \, d \cos \theta_g + \cos \theta_g \, d \cos \beta \qquad (3)$$

but on a given doppler cone, $$d \cos \theta = 0 \qquad (4)$$

so that $$\cos \theta \, d \cos \theta_g = -\cos \theta_g \, d \cos \beta \qquad (5)$$

and $$\cos \beta [-\sin \theta_g \, d\theta_g] = -\cos \theta_g [-\sin \beta \, d\beta] \qquad (6)$$

thus $$\tan \theta_g \, d\theta_g = -\tan \beta \, d\beta \qquad (7)$$

$$\text{or } d\theta_g = -\frac{\tan \beta}{\tan \theta_g} d\beta = -\cot\theta_g \tan\beta d\beta \qquad (8)$$

$$\sin\beta = \frac{h - h_t}{R} \qquad (9a)$$

$$\frac{d\sin\beta}{dh_t} = -\frac{1}{R} \qquad (9b)$$

$$d\sin\beta = -\frac{h_t}{R} \qquad (10)$$

and since $$d(\sin \beta) = \cos \beta \, d\beta, \qquad (11)$$

then $|d\beta| = \frac{h_t}{R\cos\beta} \qquad (12)$ and $\cos\beta = \sqrt{1 + \sin^2\beta} \qquad (13)$ $$\tan\beta = \frac{\sin\beta}{\cos\beta} = \frac{\sin\beta}{\sqrt{1 - \sin^2\beta}} \qquad (14)$$

from equations (9a) and (14)

$$\tan\beta = \frac{h - h_t}{R\sqrt{1 - \frac{(h - h_t)^2}{R^2}}} \qquad (15)$$

$$d\theta_g = \cot\theta_g \frac{h_t(h - h_t)}{R^2\left[1 - \frac{(h - h_t)^2}{R^2}\right]} \qquad (16)$$

Figure 5:
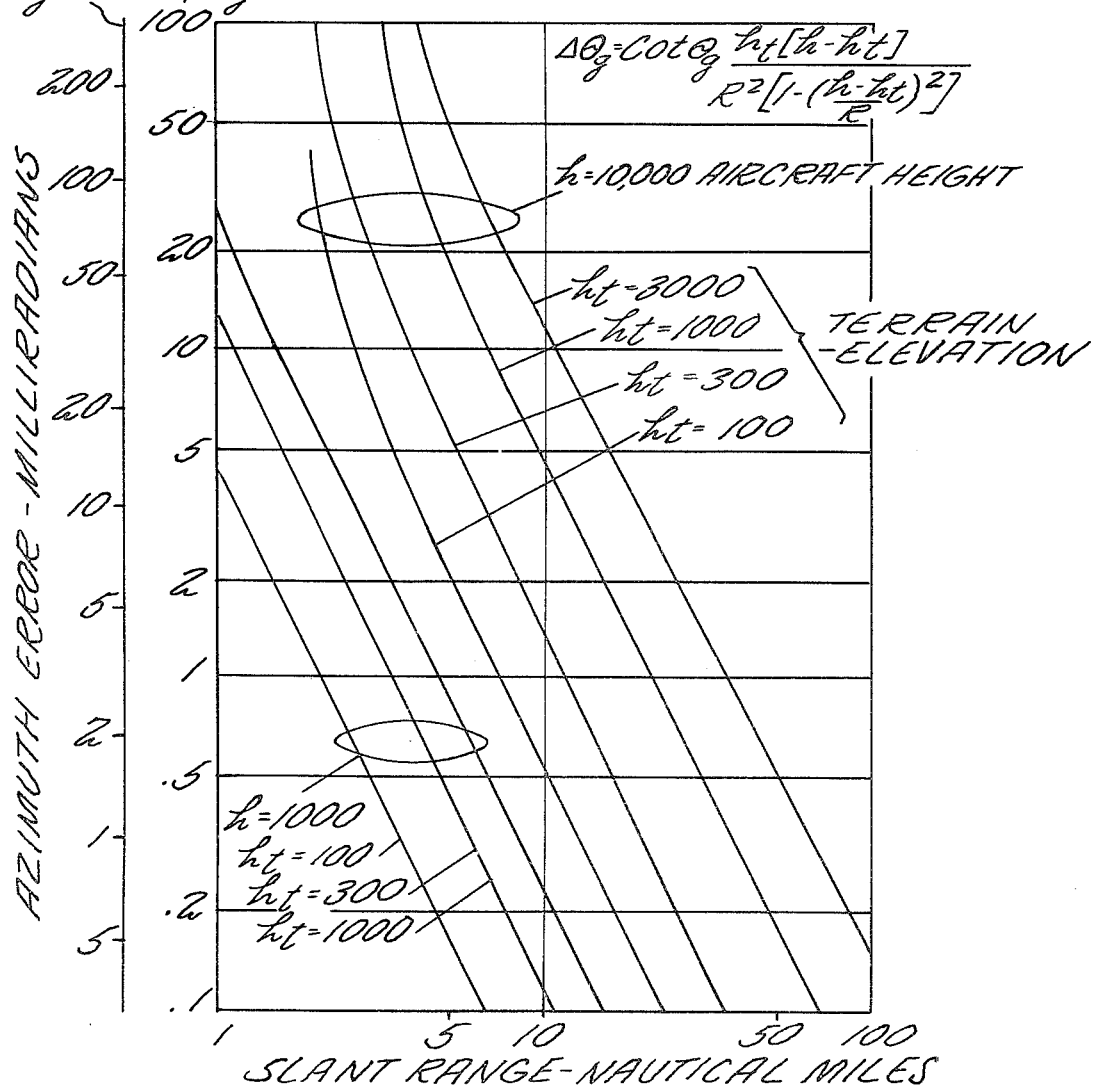
FIG. 5 is a graph of errors resulting from the range/doppler annulus ambiguity.

These results are plotted in FIG. 5 for a range of parameters of interest to a typical radar system. It shows that typical azimuth errors much larger than one tenth of a milliradian are to be expected as a result of the ambiguity of the range/doppler annulus in prior art two dimensional reflectivity radar mapping systems.

Another type of significant and serious error which results from the range/doppler ambiguity described hereinbefore relates to relative location on a reflectivity of map of any two map points which are near to each other on the map and which have different elevations. This is developed as follows:

$$\Delta Y = Y - Y_R = \sqrt{r^2 - Z^2} - \sqrt{r^2 - h^2} \quad (17)$$

$$\frac{d\Delta Y}{dZ} = \tfrac{1}{2}(r^2 - Z^2) - \tfrac{1}{2} \cdot (-2Z) - 0 \quad (18)$$

$$= -\frac{Z}{\sqrt{r^2 - Z^2}} = -\frac{Z}{R} \quad (19)$$

It is important to note that the lateral displacement as a result of a differential elevation of adjacent targets is thus shown to be independent of the arbitrarily-chosen distance h of the reference plane below the line of flight. This relationship is equal to the slope of a line within the plane of the range/doppler annulus, tangent to the annulus near the target area thereon. This therefore means that the amount of lateral displacement (d$\Delta$Y) which results in a difference in height of two adjacent targets (dZ) is as follows $$d\Delta Y = -\frac{Z}{Y} dZ \quad (20)$$

This can be shown to be equal to $$d(\Delta y) = \frac{-\sin\beta}{(\sin^2\theta - \sin^2\beta)^{\frac{1}{2}}} dz \quad (21)$$

Although in any local region of the map, the factor Z/Y may be nearly constant over many map cells, significant errors can result because of adjacent targets (having nearly the same factor Z/Y) which are, nonetheless, of different individual elevations. As described hereinbefore with respect to equation (1), since the value Z with respect to any region being mapped is equivalent to the nominal, navigational altitude of the aircraft, it is then seen that the differential lateral displacement of the target is related to the differential elevation between targets times the ratio of the altitude to the general lateral position of the target area from the ground track.

In addition, the sensitivity of ground coordinate measurements to terrain elevation (Z) can be established as follows:

$$X = R \cos \theta \quad (22)$$

$$\text{so } \frac{dX}{dZ} = 0 \quad (23)$$

$$Y = \sqrt{r^2 - Z^2} \quad (24)$$

$$\text{but } r = \sqrt{R^2 - X^2} \quad (25)$$

$$\text{so } Y = \sqrt{R^2 - X^2 - Z^2} \quad (26)$$

-continued $$\text{and } \frac{dX}{dZ} = (\tfrac{1}{2}) \frac{(-2Z)}{\sqrt{R^2 - X^2 - Z^2}} = -\frac{Z}{Y} \quad (27)$$

$$R_g = \sqrt{R^2 - Z^2} \quad (28)$$

$$\text{and } \frac{dR_g}{dZ} = (\tfrac{1}{2}) \frac{(-2Z)}{\sqrt{R^2 - Z^2}} = -\frac{Z}{R_g} \quad (29)$$

$$\text{but } \frac{-Z}{R_g} = \left(\frac{-Z}{Y}\right)\left(\frac{Y}{R_g}\right) = -\frac{Z}{Y} \sin\theta_g \quad (30)$$

Thus, a very real and significant limitation in prior art two dimensional reflectivity radar maps, related to the ambiguity in the range/doppler annulus, has been proven by the foregoing relationships.

In accordance with the present invention, a new metric, related to the depression angle $\beta$, such as R sin $\beta$, is introduced on a cell-by-cell basis into the signal processing of the entire map, and therefore provides terrain map configurations processed in three dimensions rather than in only two, thereby to yield in unambiguous, two dimensional location of map points, as well as a third map metric: individual cell elevation, configured as a map of the terrain.

Figure 6:
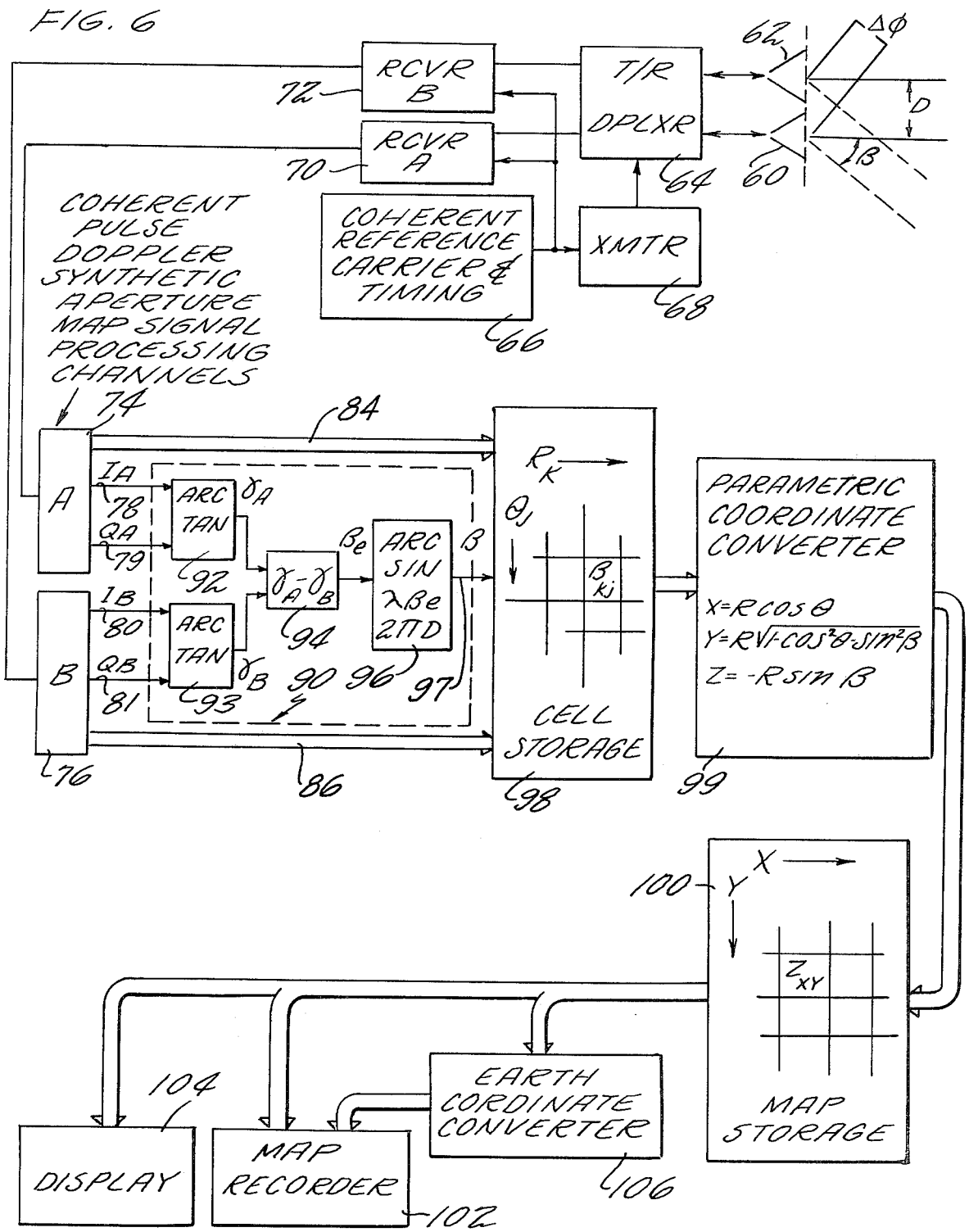
FIG. 6 is a simplified schematic block diagram of a radar system in accordance with the present invention.

Referring now to FIG. 6, one embodiment of the present invention, comprising a coherent pulse doppler synthetic aperture phase interferometer processing radar, utilizes a pair of antennas 60, 62 operated in conjunction with a transmit/receive duplexer 64 under control of a coherent reference carrier and timing generation circuit 66. The circuit 66 provides coherent carrier reference signals to a transmitter 68 and to a pair of receivers 70, 72. The components 60–72 operate as is known in the art to permit utilizing both antennas 60, 62 to illuminate the target area (although only one or both of them need be used for transmitting, or a separate transmitting antenna could be used if so desired), and alternatively, to allow the antennas 60, 62 to receive return signals from the target area and apply them, coherently, to the receivers 70, 72. This is the manner in which the front end of a known phase interferometer radar operates. As is described more fully hereinafter, the relationship between the depression angle ($\beta$) of the slant range (R) to the target and the signals received at the antenna 60, 62 is directly dependent upon the difference in phase ($\Delta\phi$) of related signals received at the two antennas 60, 62, and the vertical distance (D) between them. However, this relationship is utilized herein in a fashion which is different than in the known phase interferometer radar, as is described more fully hereinafter.

The outputs of the receivers 70, 72 are each applied to respective coherent pulse doppler synthetic aperture map signal processing channels 74, 76, which are of any suitable type known to the art. Since these are highly complex and known to the art, the details of these processing channels will not be given herein. Basically, however, the processing channels 74, 76 may provide necessary pulse compression and amplitude weighting of the time aperture (such as cosine-squared weighting) which reduces cross range interference resulting from frequency side lobes in the illumination pattern. The processing channels 74, 76 also provide center and differential focusing known to the art (which may be of the type described in my copending application Ser. No. 86,011 filed Nov. 4, 1970 entitled ACCURATE SPEED AND CONE ANGLE MEASUREMENT IN A COHERENT PULSE DOPPLER SYNTHETIC APERTURE RADAR SYSTEM). Further, motion correction (to account for the fact that the antenna is moving with respect to the target), as well as aircraft attitude correction, may be provided to the signals in the processing channels. Each signal processed is then allocated to a given range/doppler cell as a result of range gating and doppler filtering. The actual, processed signals can then be averaged over the sampling time interval, to provide signal information equivalent to a magnitude plus a phase angle. All of this is also known to the art. In the present instance, these signals are preferably provided in terms of two vectors, one being an in-phase vector and one a quadrature vector. Thus, the numerical value for each of the two outputs of both of the synthetic aperture radar processing channels ($I_A$, $Q_A$; $I_B$, $Q_B$) on lines 78–81 comprises merely a numerical representation of the magnitude of the processed signal.

Thus, the components 60–76 of FIG. 6 provide the same information, with respect to each respective antenna 60, 62, as that provided by coherent pulse doppler synthetic aperture radar processing channels known to the prior art. Thus far, the distinction is that two separate channels (A and B) are utilized herein, rather than only a single channel as in prior art mapping radars. The outputs of the channels 74, 76 comprise the in-phase and quadrature signals, each being allocated to a like range/doppler cell. That is, for each $I_A$, $Q_A$ related to a given range/doppler cell, there will be an $I_B$, $Q_B$ related to the same range/doppler cell. This, plus internal processor coding information on bus lines 84, 86 (which identify that range/doppler cell to which the information relates) comprise the only necessary outputs of the coherent pulse doppler synthetic aperture processing channels 74, 76.

In accordance with the invention, resolution of the range/doppler annulus is provided by a processor 90 which may be incorporated directly in the hardware which comprises the processing channels 74, 76 if desired, but is shown herein (for simplicity of understanding) to comprise four functional blocks 92–96. The blocks 92, 93 form the arc tangent of the in-phase and quadrature signals so as to supply the phase angle of the processed signals ($\gamma A$, $\gamma B$). The difference in these signals (taken by block 94 in any well known fashion) provides a unique electrical phase difference, $\beta_e$, relating only to those signals allocated to the corresponding range/doppler cell. The depression angle, $\beta$, is determined (from the electrical phase difference between signals allocated to a given range/doppler cell) by the block 96, from the well known phase interferometer equation $$\sin\beta = \frac{\lambda\beta_e}{2\pi D} \tag{31}$$

where D=the distance between the antennas 60, 62 in their common plane, and $\lambda$=the radar wavelength.

$$\text{Thus: } \beta = \sin^{-1}\left(\frac{\lambda\beta_e}{2\pi D}\right) \tag{32}$$

Of course, all of the parameters of the arc sin to be solved by the block 96 are constant, with the exception of the electric angle, $\beta_e$.

As the aircraft flies along a straight flight path, both the slant range, R, to a map point and the depression angle, $\beta$, to the map point change. However, the elevation of the map point remains substantially constant throughout a mapping interval spanning straight line flight. Therefore, the elevation parameter, $R \sin \beta$, may preferably be provided for storage in the cell storage 98 since this permits averaging the elevation of the map point over the entire sampling interval, thus resulting in a reduction in clutter and noise. Thus, as an alternative, within the precepts of the present invention, instead of taking the arc sin, the block 96 may simply calculate R $$\sin\beta = \frac{R\lambda\beta_e}{2\pi d},$$

and this parameter stored for each doppler cell in the cell storage 98 (instead of simply storing $\beta_{kj}$).

It should be noted that either analog or digital computation means may be utilized to perform the functions within the block 90, as well as the other, known function of the pulse doppler synthetic aperture processing channels A and B (74, 76).

A signal on a line 99 representing the measured parameter, $\beta$, together with the signals on lines 84, 86 identifying the unique range/doppler cell to which the parameter relates, are applied to a cell storage device 98. In this fashion, a matrix of uncorrected data for an entire map may be stored; the storage location utilized is the $k_j$th location for the jth range slice and the kth doppler cone (the $k_j$th range/doppler cell), and the stored parameter is the depression angle $\beta$ determined from the I's and Q's relating to the $k_j$th doppler cell. Thus, a measure of $\beta$ is provided for each of the cells in the uncorrected map data matrix of range/doppler cells in the cell storage 98.

As described with respect to the analysis of prior art reflectivity maps given hereinbefore, the values of $\beta$ allocated to a given range/doppler cell would be located erroneously with respect to the terrain points being mapped in the event that the location of map points were taken to be a literal extension of the range/doppler cell for which the angle $\beta$ has been derived. To correct for the mislocation of map points described hereinbefore, and thereby generate a correct configuration of the terrain being mapped, it is necessary to relate the measured elevation angles to a set of proper coordinates with respect to the mapped terrain. Although, of course, the designation of coordinates is arbitrary and may be chosen with wide latitude, the coordinates utilized herein are the X, Y, and Z coordinates referred to hereinbefore, in which the X axis is along the line of flight of the aircraft; the Y axis in the plane of the aircraft perpendicular to the line of flight; and the Z axis parallel with the altitude of the aircraft. Reference to FIGS. 1 through 4 illustrates, from simple geometry, that the coordinates of the correct location of the map points relating to a given range/doppler cell are defined in terms of the range, the doppler cone angle $\theta$, and the depression angle to the map point $\beta$ as follows:

$$X = R \cos \theta \tag{33}$$

$$Y = R\sqrt{\sin^2\theta - \sin^2\beta} \quad (34)$$

$$= R\sqrt{1 - \cos^2\theta - \sin^2\beta} \quad (35)$$

$$Z = -R \sin\beta \quad (36)$$

Thus, X, Y and Z coordinates for any map point may be defined in terms of the given parameters R, and $\theta$ and the measured parameter $\beta$, for each range/doppler cell.

The conversion of range, doppler and depression angle for each range/doppler cell of the cell storage 98 to a corrected X and Y coordinate system is achieved in a parametric coordinate converter 99, in which the operations of equations 39, 41 and 42 are performed utilizing well known processing techniques. A typical manner of achieving the conversion is to address a given location in the cell storage 98. The address by definition includes $R_k$ and a function of $\theta_j$, and the value read from the address location is the measured parameter for that range/doppler cell, $\beta_{kj}$. Conveniently, high and low order addressing cell storage may provide for an R-portion of the address and a $\theta$-portion of the address in the cell storage 98. Then the address utilized to access a given value of $\beta_{kj}$ also forms parameters for the calculations performed in the parametric coordinate converter 99. The output of the parametric coordinate converter 99 is applied to a map storage 100 which comprises a matrix of storage cells arranged in an X, Y coordinate, with the value stored in each storage location comprising the new map metric $Z_{xy}$. Thus, an address is formed of X and Y, and the value calculated for Z is stored in that address.

It should be noted that the correction of the location of the map in the cross range direction, herein taken as in the Y coordinate direction, may be made for a two dimensional reflectivity map of the type known to the prior art. Thus, the depression angle $\beta$ may be utilized to correct the location of a given target point, but the amplitude of reflectivity may be the value stored for that target point, rather than elevation as derived in equation (36). However, the invention encompasses both the correction of range doppler ambiguity for either two dimensional or three dimensional maps, as well as the generation of three dimensional maps utilizing the new map metric, elevation, as found by equation (36).

Figure 7:
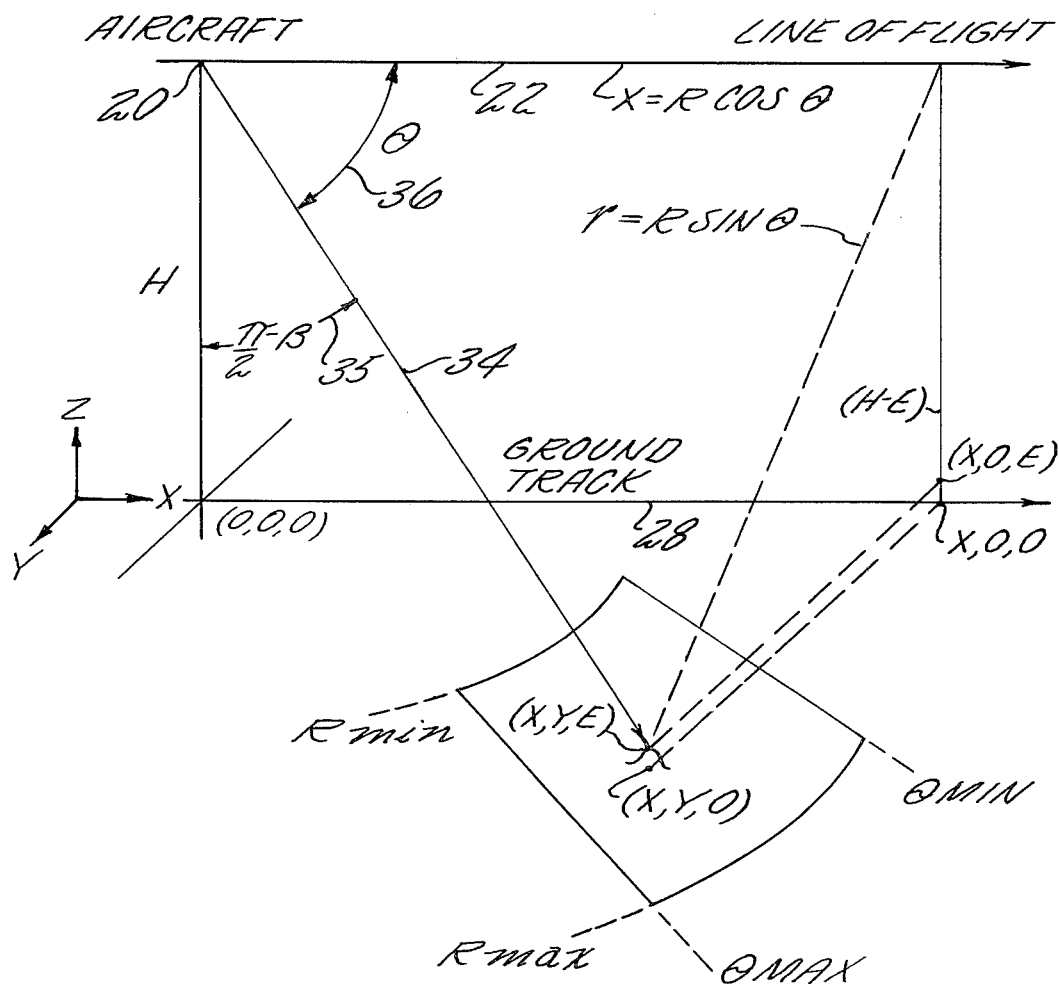
FIG. 7 is a simplified perspective illustration of geometric relationships which relate to the present invention.

In order to achieve a coordinate system in which the elevation of the target is given in terms of its distance above the nominal ground plane located at an altitude H below the line of flight, as illustrated in FIG. 7, the elevation parameter, E, must be related to the Z coordinate and the altitude H. But this again requires no more than a simple geometric conversion.

$$E = H - R \sin\beta \quad (37)$$

The output of the map storage 100 may be applied to any suitable utilization means 101, which may include a map recorder 102 and/or a display 104, in dependence upon the utility desired for the generated map. As is known, the instantaneous display may be utilized for terrain avoidance, landmark (target) identification, or navigational assistance. If desirable, a map defined in terms of a Cartesian coordinate system related to the aircraft may be relocated by a navigational coordinate converter 106 so as to be defined in terms of navigational coordinates on the earth's surface. Thus, the X axis may be in a north-south direction, the Y axis in an east-west direction, and, of course, the Z axis would remain the same (elevation). This operation would require no more than geometric conversion utilizing inputs from the aircraft's navigational system. Thus, if the plane were flying west as the mapping operation proceeded, the map would be rotated 90° through simple geometric conversions. In addition, all usage to which prior art reflectivity maps have been put can be accommodated, more accurately and with greater correspondence, as well as with the new map metric: elevation.

The nature of the map which the present invention will provide, and its contrast to prior art reflectivity maps, are illustrated in FIGS. 8-12. FIG. 8 is an illustration of the flight path 22 in two positions. (A, B) of mapping along the flight path. The map information that results from the operation of FIG. 8 in accordance with the present invention is illustrated in FIGS. 9 and 10; FIG. 9 illustrates the map made from position A, and FIG. 10 illustrates the map made from position B. It can be seen that there is a high degree of correspondence between the two maps. On the other hand, the reflectivity maps of the prior art which would obtain as a result of the mapping operation illustrated in FIG. 8 are shown in FIGS. 11 and 12. It is obvious that there is a great difference, and a lack of correspondence, in the reflectivity of the same map area when viewed from the two different positions (A, B) of FIG. 8. This is due mainly to the fact that the prior art maps are not provided with correction of point locations to compensate for the range/doppler annulus ambiguity. But it also is due to variations in reflectivity of a given target point as a function of aspect, time, weather, etc.

Figure 13:
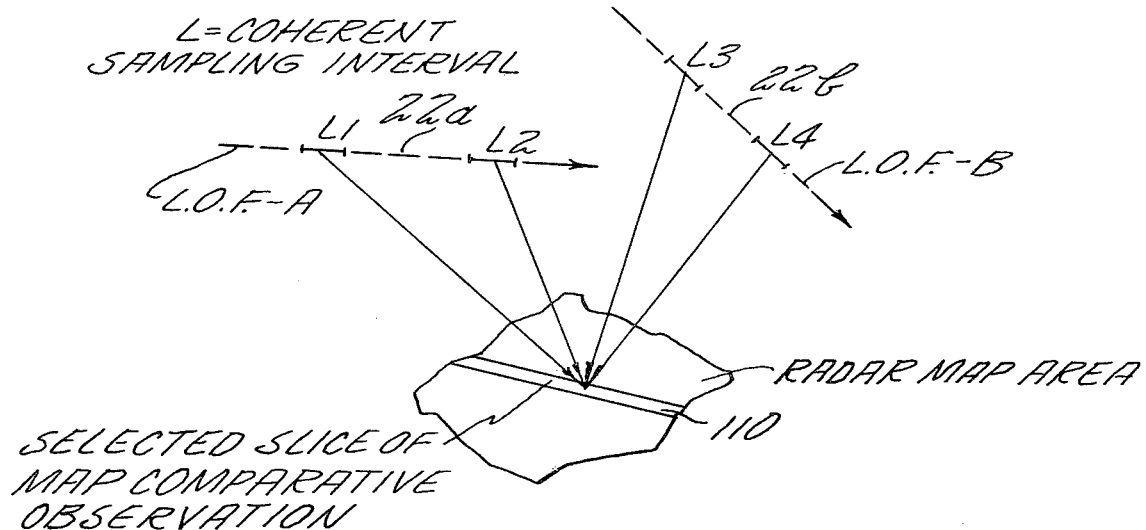
FIG. 13 is a simplified perspective illustration of a pair of radar mapping situations.
Figure 14:
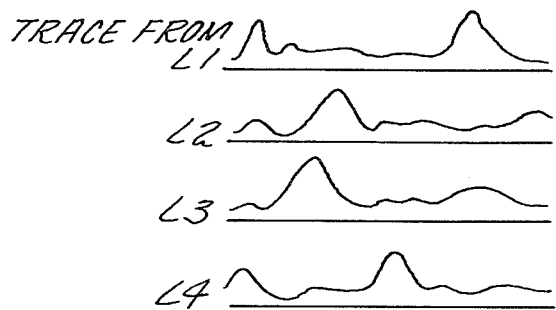
FIG. 14 is a simplified illustration of the results of the mapping situations of FIG. 13 in accordance with the prior art.
Figure 15:
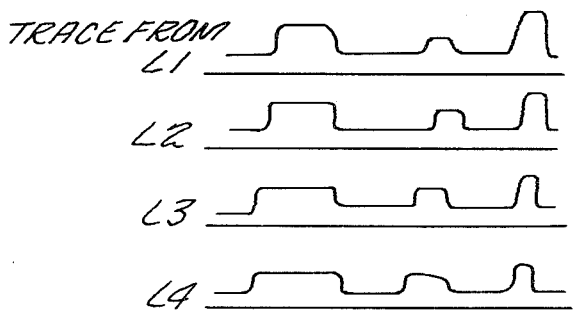
FIG. 15 is a simplified illustration of the results of the mapping situations of FIG. 13 in accordance with the present invention.

This is further illustrated in FIGS. 13-15. FIG. 13 illustrates two different lines of flight designated as 22a and 22b. On each line of flight, two different mapping intervals (L) will result in two different maps of the same area. FIG. 14 illustrates the display trace which may be achieved of a strip or slice 110 of the map area of FIG. 13, as generated by prior art reflectivity, two dimensional coherent pulse doppler synthetic aperture processing systems. Thus it can be seen that along the same line of flight 22a, the trace generated during interval L1 differs from the trace generated in interval L2; similarly, the trace generated during interval L3 in the second line of flight 22b differs from that generated during interval L4. Both intervals in the line of flight 22a differ from both intervals in the line of flight 22b. In other words, there is absolutely no correspondence between any of the mapping intervals of the same slice 110 of the map area. In contrast, FIG. 15 illustrates that there will be a high degree of correspondence between not only different intervals (L1, L2) of a given line of flight (22a), but also between other intervals (L3, L4) of a completely different line of flight (22b), using the present invention.

Consideration of FIGS. 8-15 illustrates a great distinction between mapping techniques of the present invention and problems encountered in the prior art. In an attempt to average out clutter and noise, the summation of several maps (such as those shown in FIGS. 11 and 12) would not result in an increase in the signal to noise/clutter ratio of a summation map, but would instead cause a loss of information since given map points of the same terrain have differing reflectivity values as illustrated by a comparison of FIGS. 11 and 12. Thus, since the maps are not in fact the same (even though they allegedly depict the same terrain) addition of two reflectivity maps in fact causes a loss of information, rather than an increase in it. However, due to the high correspondence between two separate maps of the same terrain in accordance with the present invention (FIGS. 9 and 10), coherent addition of maps is possible, so that clutter and noise may be averaged out, and mapped quality increased, rather than lost, in accordance with the present invention.

Figure 16:
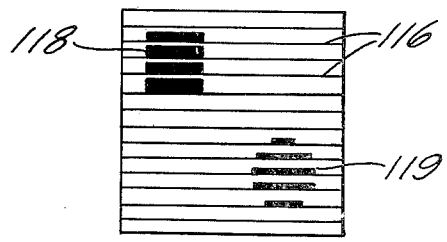
FIG. 16 is a simplified plan view of one form of three dimensional map display in accordance with the present invention.
Figure 17:
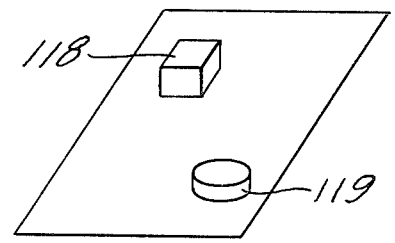
FIG. 17 is a simplified plan view of a second form of three dimensional radar map display in accordance with the present invention.

There are, of course, a variety of ways in which the present invention may utilize the information derived from interferometric coherent pulse doppler synthetic aperture processing. One illustration of a display of a three dimensional map is illustrated in FIG. 16 (Sheet 2). Therein, elevations are seen to be represented by brightening of the traces 116 in areas 118, 119 of greater elevation. The same terrain represented in the display of FIG. 16 may also be displayed in three dimensional (isometric) fashion, as illustrated briefly in FIG. 17. Therein, the three dimensional aspects 118, 119 of the mapped terrain are drawn in a literal fashion corresponding thereto. The map segments illustrated on the displays of FIGS. 16 and 17 may comprise high resolution sectors of a much larger, low resolution map, thereby permitting detailed examination of landmarks in a relatively limited area.

It should be noted that even though the present invention utilizes the known characteristics, techniques and hardware of pulse doppler synthetic aperture processing radars in combination with the known phase interferometer relationship of a pair of related antennas, the utilization is not the mere combination of the two; the present invention would provide no advantage over the art if the depression angle to the target were not utilized, as in equation (35), to provide correction of the cross range location of the target point resulting from the range/doppler annulus ambiguity.

Further, the depression angle $\beta$, may be determined using monopulse or other known directional techniques, provided only that the angle $\beta$ is determined after range/doppler processing on a cell-by-cell basis.

As an example, an amplitude monopulse system provides in-phase and quadrature components related to angle of receipt by their amplitudes (rather than by relative phase angle as in the interferometer). For channel A, $$A_A = \sqrt{I_A^2 + Q_A^2} \qquad (38)$$

and for channel B $$A_B = \sqrt{I_B^2 + Q_B^2} \qquad (39)$$

$$\text{Then } \beta = K \left| \frac{A_A - A_B}{A_A + A_B} \right| \qquad (40)$$

where K = a constant relating to the monopulse characteristics of the radar, as is well known in the art. Thus, $\beta$ may be determined in accordance with this invention from the cell-by-cell outputs of a pair of coherent pulse doppler synthetic aperture signal processing channels which are responsive to any antenna/receiver means sensitive to angle of receipt of return signals.

Further, although two processing channels 74, 76 are shown in the preferred embodiment of FIG. 6, the invention may be practiced as well by the multiplexing of signals through a single, similar processing channel, using multiplexing techniques known to the art.

Although the invention has been shown and described with respect to a preferred embodiment thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. A signal processing radar comprising:

coherent pulsed radar transmitting and receiving means for illuminating targets with radiation at a determinable wavelength, including a plurality of radar antenna elements and a pair of receiver means, each of said receiver means receiving radar return signals from related ones of said antenna elements;

coherent pulse doppler synthetic aperture radar signal processing means responsive to said receiver means, said processing means including range gating and doppler filtering to allocate each return signal to a corresponding range/doppler cell, said processing means providing, for each range/doppler cell, a related set of processed signals, the relative information content of which is dependent upon the relative phase angle of arrival of the respective return signals at said radar antenna elements from which the processed signals have been derived;

means responsive to said processed signals from said processing means for generating a signal manifestation of the depression angle at which the return signals related to said processed signals were received by said antenna elements as a function of the difference in said angle of arrival between said return signals relating to a given range/doppler cell, of said determinable wavelength, and of the parameters of said antenna elements; and means for generating, for each range/doppler cell, in response to the range and doppler identification of that cell and the depression angle signal manifestation relating to that cell, a pair of signal manifestations identifying orthogonal coordinates in a map of a corresponding map point location relating to said range doppler cell in accordance with the following relationships, $$Y = R \sqrt{1 - \cos^2\theta - \sin^2\beta}$$

where R equals the slant range of the range/doppler cell, $\theta$ equals the cone angle of the doppler frequency of the range/doppler cell, and $\beta$ equals the depression angle to the target for that range/doppler cell.

2. A signal processing radar according to claim 1 wherein said last named means additionally comprises means for generating, for each map point location, a manifestation, Z, of map point elevation from the relationship $$Z = -R \sin \beta.$$

3. A signal processing radar comprising:

coherent pulsed radar transmitting and receiving means for illuminating targets with radiation at a determinable wavelength, including a plurality of radar antenna elements and a pair of receiver means, each of said receiver means receiving radar return signals from related ones of said antenna elements;

a pair of coherent pulse doppler synthetic aperture radar signal processing channel means, each responsive to a related one of said receiver means, each of said processing channel means including range gating and doppler filtering to allocate each return signal from the related receiver means to a corresponding range/doppler cell, each of said processing means providing, for each range/doppler cell, processed signal manifestations including elements magnitude and phase angle, the phase angle being dependent upon the relative phase angle of arrival of the respective return signals at said radar antenna elements from which the processed signals have been derived;

means responsive to said processed signals from both of said processing channel means for generating a signal manifestation of the depression angle at which the return signals related to said processed signals were received by said antenna elements as a function of: the difference in electrical phase between the processed signal manifestations from one of said processing channel means relating to a given range/doppler cell and the processed signal manifestations from the other of said processing channel means for the same given range/doppler cell; said determinable wavelength; and the parameters of said antenna elements; and means for generating, for each range/doppler cell, in response to the range and doppler identification of that cell and the depression angle signal manifestation relating to that cell, a pair of signal manifestations identifying orthogonal coordinates in a map of a corresponding map point location relating to said range doppler cell in accordance with the following relationships, $$X = R \cos \theta$$

$$Y = R \sqrt{1 - \cos^2\theta - \sin^2\beta}$$

where R equals the slant range of the range/doppler cell, $\theta$ equals the cone angle of the doppler frequency of the range/doppler cell, and $\beta$ equals the depression angle to the target for that range/doppler cell.

4. A signal processing radar according to claim 3 wherein said last named means additionally comprises means for generating, for each map point location, a manifestation, Z, of map point elevation from the relationship $$Z = -R \sin \beta.$$

* * * * *

UNITED STATES PATENT AND TRADEMARK OFFICE
CERTIFICATE OF CORRECTION

PATENT NO. : 4,321,601
DATED : March 23, 1982
INVENTOR(S) : Donald Richman

It is certified that error appears in the above—identified patent and that said Letters Patent is hereby corrected as shown below:

Column 6, line 53 "reader" should be --radar--.

Column 7, line 67 "the" (second occurrence) should be --an--.

Column 8, line 20 "dcos$\theta$ =0" should be --dcos$\theta$ =·0--.

Column 8, line 22 "cos $\theta$ dcos$\theta_g$ = - cos$\theta_g$ dcos $\beta$" should be --cos $\beta$ dcos$\theta_g$ = - cos$\theta_g$ dcos $\beta$--.

Column 8, line 50 "cos$\beta$ = $\sqrt{1 + \sin^2\beta}$" should be --cos$\beta$ = $\sqrt{1 - \sin^2\beta}$--.

Column 10, line 68 "86,011" should be --87,011--.

Column 16, line 52 insert --X = Rcos$\theta$--.

Signed and Sealed this

Seventeenth Day of August 1982

[SEAL]

Attest:

GERALD J. MOSSINGHOFF

*Attesting Officer*     *Commissioner of Patents and Trademarks*